April 30, 1940.                G. H. EVANS                2,199,308
                               SIGN APPARATUS
                          Filed June 28, 1938            3 Sheets-Sheet 1
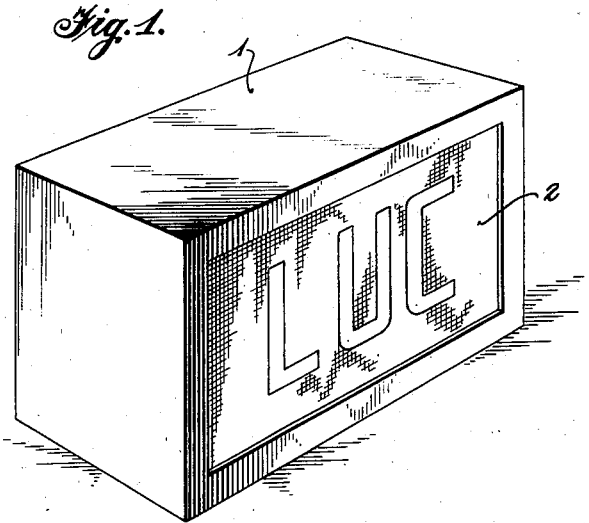
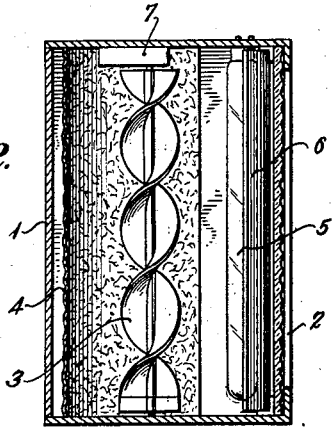
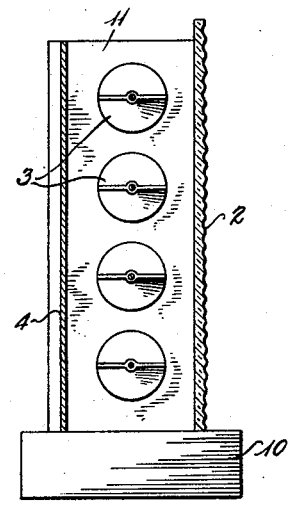
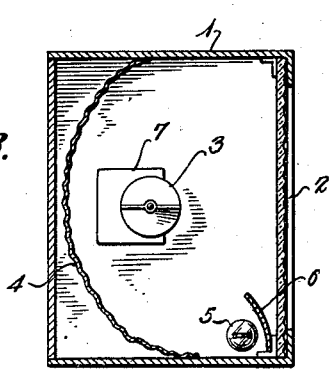
Inventor
George H. Evans
By Stevens & Davis
Attorneys April 30, 1940. G. H. EVANS 2,199,308
SIGN APPARATUS
Filed June 28, 1938 3 Sheets-Sheet 2

Inventor
George H. Evans
By Stevens and Davis
Attorneys

April 30, 1940.                G. H. EVANS                2,199,308
                             SIGN APPARATUS
                         Filed June 28, 1938          3 Sheets-Sheet 3

Inventor
George H. Evans
By Stevens and Davis
Attorneys

Patented Apr. 30, 1940

2,199,308

UNITED STATES PATENT OFFICE 2,199,308

SIGN APPARATUS

George H. Evans, Washington, D. C., assignor of one-half to Richard K. Stevens, Washington, D. C.

Application June 28, 1938, Serial No. 216,361

24 Claims. (Cl. 40—133)

This invention relates to advertising devices and more particularly to that type of devices which are illuminated and have means for causing the motion of a light pattern.

Heretofore in the designing of advertising media, it has been a well-recognized fact that a display including motion is more attractive than a motionless display. Consequently, many types of displays have been made, which incorporate various moving parts, in an effort to attract the attention of the potential buyer. The motion has been of various types and has included many different kinds of moving parts. Reflecting media has been extensively used in an effort to simulate various types of motion. The vast majority of these signs, however, are not particularly attractive, nor have they enjoyed any considerable amount of success.

The object of the present invention is to provide an advertising sign or display device that presents an illuminated design or light pattern that is caused to move in a manner such that it will attract the attention of the public. In addition, this invention contemplates means for presenting a movement of light so that the physical shape of the means for causing the light pattern is disguised so as to present a diffused, sparkling, bubbling, scintillating, and/or even an ethereal effect. Furthermore, the light causing means is adapted to provide the maximum amount of light with the minimum of material so that these devices may be constructed and operated at low cost and may be equally as attractive during the daylight as after dark.

According to the preferred embodiment of this invention, a movable reflecting medium is provided in back of a diffusing screen in such a manner that this reflecting medium may receive light from any desirable source and direct said light through said diffusing screen. Either the reflecting means or the diffusing screen or both may be so fashioned that they will break each light ray into a plurality of rays and distort and/or disguise the reflected image. The preferred type of reflecting medium comprises a spirally twisted strip of material such as metal foil, the fins of which have been corrugated or otherwise deformed to provide a plurality of reflecting surfaces lying at different angles, whereby light from substantially any direction may be reflected in a predetermined direction and through the diffusing panel. This spiral strip is preferably twisted in a predetermined manner so as to present a series of substantially square reflection portions. The diffusing panel may comprise almost any type of diffusing medium but preferably is formed by a glass plate having at least one surface which is serrated or undulating to form a plurality of lenses or prisms on said surface. A light source may be positioned with respect to the reflecting medium and the diffusing panel so as to present the maximum amount of light. If desired, the light source may be omitted, whereby the light pattern will depend purely upon incidental light to cause the light reflection through the panel.

Other forms and arrangements of these parts may be used and still remain within the spirit of this invention. For instance, a very desirable effect may be secured from certain modifications of the movable reflecting member in association with various types of diffusing panels. On the other hand, the diffusing panel may be used in connection with a relatively plain reflector medium or with a plurality of plain reflecting surfaces that are moved about in a predetermined manner. The diffusing medium may comprise a number of forms such as a glass plate having a prismatized surface, a lenticulated surface, corrugated or otherwise irregular or undulating surface. The surface formation may be on either one or both sides of the panel. Furthermore, materials other than glass may be used and many of the newly developed moulding plastics have proven most satisfactory.

The above described embodiments of my invention incorporate and illustrate the basic principles that may be common to any of the various methods and/or combinations that it may be desired to use. That is the reflecting medium may be used in combination with the screen so as to break up the reflected light into an indistinguishable light image and to prevent the immediate realization of the form of the source of the light pattern. On the other hand, the diffusing medium may be solely relied upon for breaking up the light pattern and may be in various shapes and forms according to the light image it is desired to ultimately produce. Whereas a prismatized glass panel will produce a starry effect, a lenticulated glass panel will produce a bubbly effect. In addition to producing these light images of indistinguishable design, this invention accomplishes this result in an easy and practical manner with a minimum of parts and consequently will produce a display device that will present the maximum result with the least difficulty.

The invention both as to its organization and method of operation, together with additional objects and advantages thereof, will best be understood from the following description of the specific embodiments when read in connection with the accompanying drawings, wherein like reference characters indicate like parts throughout.

Fig. 1 is a view in perspective of a sign embodying the principles of the present invention;

Fig. 2 is a view in cross section taken along a horizontal plane of the sign shown in Fig. 1;

Fig. 3 is a view in cross section taken along a vertical plane from front to rear of the sign shown in Fig. 1;

Fig. 4 is a view in cross section taken on a vertical plane through a sign comprising a modified form of the present invention;

Figure 21:
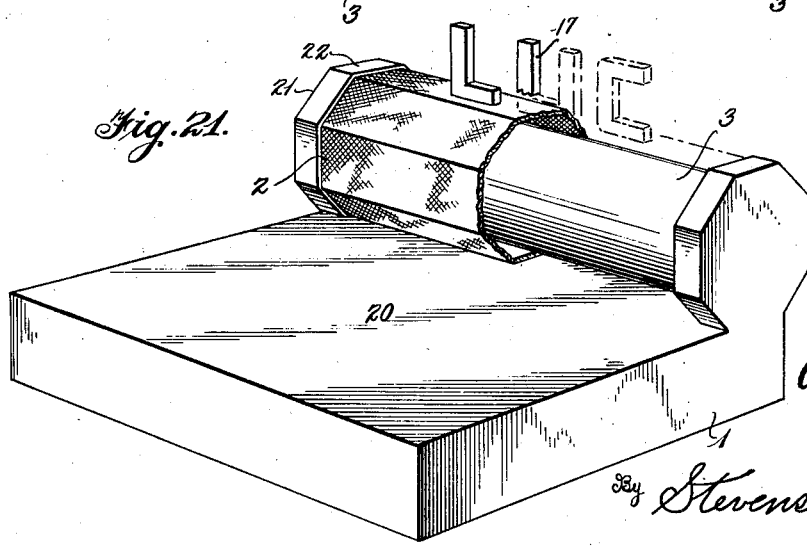

Figs. 7, 8, 9, 10, 11, and 12 each show details of modified forms of reflecting members particularly suitable for incorporation in the present invention;

Figs. 13, 15, 17, and 19 are fragmentary views in elevation of the front surfaces of glass screens particularly suitable for incorporation in the present invention;

Figs. 14, 16, 18, and 20 are fragmentary views in cross section of the glass screens shown in Figs. 13, 15, 17, and 19; and Fig. 21 is a view in perspective of an additional modification of the present invention having a portion broken away to show the reflecting element.

As shown in Fig. 1, the present invention embodies a sign which may comprise a housing 1 having a panel or screen 2 located in the front wall of the housing through which light may pass from the interior of the housing to an observer. The present invention may be incorporated in any desired type of sign, but in the present instance a box type is being used as a suitable illustration. Advertising media may be combined, in any preferred manner, with the screen 2. This media may comprise opaque members to be shown in silhouette, transparent or translucent members, which may be colored if desired, or openings surrounded by a mask of opaque, translucent, or transparent material.

As more clearly shown in Figs. 2 and 3, a movable reflecting member 3 is located within the housing so as to direct light through the screen 2. This movable reflector 3 may be rotated by any suitable type of motor 7. A background or stationary reflector 4 is located behind the movable reflector to provide a suitable contrast either in light values or color values. A light source 5 is located along a front corner of the housing to direct light to the movable reflector 3 and the background 4 which is thereby reflected out of the housing through the screen 2. A light guard 6 partially surrounds the light source to prevent light falling directly upon the screen 2. The under side of this light guard may comprise a reflecting surface to direct as much light as possible on to the movable reflector 3 and the background 4.

According to the subsequent disclosure contained herein, the movable reflector 3 may comprise various shapes and modifications. The preferred form, however, as more clearly shown in Fig. 2 comprises a strip of reflecting material which is twisted so as to present continuously moving reflecting surfaces upon being rotated. A reflector of this type is adapted to reflect light in all directions as it rotates, and consequently a light image reflected therefrom may be visible at acute angles. The strip may be of any suitable reflecting material, and in the present instance a reflector member formed from metal foil has proven most efficient.

Many modifications and arrangements of the present invention have been tested and examined, and it has been proven by laboratory experiment and by actual use that, to obtain the best results, it is desirable to have a source of light extending substantially the full length of the reflector member. By using an unbroken line of light extending the full length of the reflector member, a light pattern is obtained even at acute angles with respect to the face of the sign. This source of light may be provided in any desired manner, but it has been found that the long filament incandescent bulbs are the most suitable in view of their low initial price and reasonable cost of operation. In addition, they may readily be replaced by an inexperienced operator, and due to their wide distribution are easily secured.

It is not always necessary to include a source of light within the sign, inasmuch as in some locations there is sufficient light emanating from sources surrounding the sign which is passed through the glass screen on to the reflector, and in turn is cast back through the screen to the outside. One particular instance where this type of sign has proven most effective has been its use in window displays. Most store windows are provided with rather powerful lamps which provide sufficient illumination to permit a sign without a built-in source of light to operate most satisfactorily.

On the other hand, it has been found that a sign having a source of light incorporated therewith can be located in a position where considerable light from the exterior may be cast through the screen on to the reflectors. The extraneous light does not interfere with the light emanating from the built-in source. In fact, pleasing light designs may be obtained through this combination of extraneous light and built-in light by supplying sources of built-in light having different light values or color values from that of the extraneous light.

A modified type of sign which has proven most attractive and successful and which does not incorporate a built-in source of light is shown in Fig. 4. This modification operates quite satisfactorily using only extraneous light as a source for producing the light patterns. This comprises a base 10 having one or more supporting columns 11 extending upward therefrom, a glass screen 2 extending across the front, and a suitable background 4 located across the back thereof. A plurality or bank of reflecting members 3 are supported by said one or more columns 11. A suitable source of power may be located in the base 10, and any desired transmission means may extend through one of the columns 11 to provide the reflecting members 3 with a rotating motion.

Figure 5:
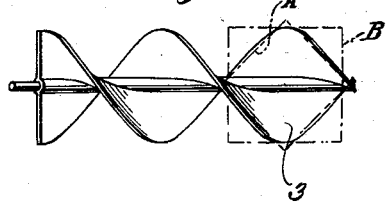
Fig. 5 is a detailed view of one form of reflecting member used in the present invention.
Figure 6:
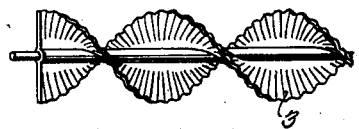
Fig. 6 is a detailed view of a modified form of the reflecting member shown in Fig. 5.
Figure 7:
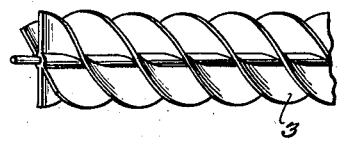
Figure 8:
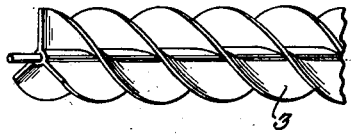
Figure 9:
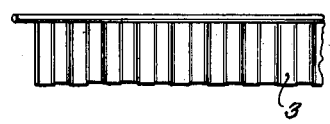
Figure 10:
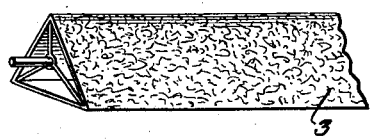

As shown in Figs. 5 to 8, the rotatable reflecting members comprising spirally wound strips of reflecting material may be provided with any desired number of fins. Figs. 5 and 6 show a member comprising a flat strip which is twisted about its longitudinal axis to produce a spiral having but two fins. Fig. 9 shows a reflecting member having four fins extending at right angles from each other, and Fig. 10 shows a reflecting member having three equi-angular fins. Each of these members is desirable for producing different effects or light patterns to be viewed by an observer. The use of these several types of reflectors may be made according to the type of light pattern it is desired to obtain. The two-fin members as shown in Figs. 5 and 6 produce a multiple unit sparkling or scintillating effect that includes a movement of the units along the length of the reflecting member. The light effect produced by the two-fin members comprises a plurality of sparkling or scintillating blobs that move across the screen 2. In contrast, a four-fin member as shown in Fig. 7 produces more of a flaming effect having substantially no motion along the length of the member. On the other hand, the three-fin member as shown in Fig. 8 produces an effect substantially midway between that produced by the two-fin and the four-fin members. In other words, while producing a combined sparkling and flaming effect, there is also a slight movement of the light effect along the length of the reflector.

It has been discovered that if these reflectors are formed in a predetermined manner they produce a light pattern that is considerably more attractive than if they have other formations. This is particularly true with the two-fin reflectors, and accordingly the reflector illustrated in Fig. 5 is shown to be formed in this manner. This desirable effect is obtained by twisting the strip so that each turn of 180° forms a reflector surface that is substantially square when viewed from the side of the strip. In other words the edge of each reflector surface will substantially coincide with the sides of a square A as shown in broken lines and the extreme opposite points of each reflector surface will lie in the sides of a square B midway between the corners thereof. The light pattern produced by this formation comprises a series of individual units or blobs of light composed of stars or bubbles or the like according to the type of screen used.

A modification of the rotatable reflector which has proven most desirable is shown in Fig. 6. This reflector is formed in a manner to provide a plurality of light reflecting surfaces so as to collect and reflect light from many angles. Furthermore the multiple reflecting surfaces break the light up into a plurality of units so as to give the effect of diffusion. This type of reflecting surface is more successful in producing a pattern or design of light rays and thereby disguising the physical formation of the reflecting member and/or light source. In addition, due to the fact that the reflecting surfaces lie in many planes at many different angles to each other, some of the light rays will be reflected at acute angles and consequently the light patterns will be visible even though an observer is located at one side of the sign. The undulating or deformed reflecting surface may be provided by forming the surface into a series of corrugations or ridges.

If a metal foil is used, as pointed out hereinabove, it may simply be crumpled and then more or less smoothed out so as to present a wrinkled surface. Another manner of forming a multiple reflector surface is by cutting the edges of the fins and bending the cut portions at angles with respect to each other. Other methods of obtaining a similar effect as above described may be used, such as forming convex or concave reflecting surfaces on the fins or by making indentations therein or in any other manner which will provide a reflecting member having a plurality of reflecting surfaces which are arranged to reflect light from different angles. The preferred form, however, both from the standpoint of the light effect obtained, the ease of manufacture, and durability, is to corrugate the strip as described above. The modifications of this type of reflecting member which are shown in Figs. 7 and 8 may be arranged similar to the modifications just described and shown in Figs. 5 and 6. That is, the fins of these members may have smooth surfaces, or the surfaces may be deformed so as to break up the light reflected therefrom into a plurality of units.

Another type of reflector which may be incorporated in the present invention comprises but a single fin extending from one side of the axis thereof and is shown in Fig. 9. This single fin may be perfectly smooth, but preferably it is corrugated or otherwise deformed so as to break up the reflected light into a plurality of units. Instead of causing the single reflector fin to completely rotate, it may be desirable to merely oscillate the reflector fin to produce an effect of a combination of motions in the light pattern.

The single fin reflector has many specific uses wherein the result produced thereby may be more attractive and successful than that of the hereinbefore described reflectors. For instance, a bank of single fin reflectors may be used to produce a scintillating effect that appears to have a plurality of motions in different directions. On the other hand, due to the fact that the single fin may be of comparatively narrow width, a reflector of this type may be used most successfully in combination with a narrow border panel surrounding or adjacent the main portion of the sign.

Figure 11:
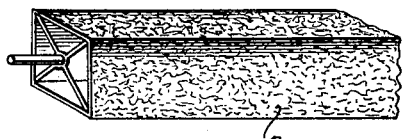
Figure 12:
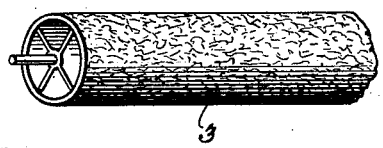

Other types of reflector members which have proven very useful in producing a predetermined unique light effect are shown in Figs. 10, 11, and 12. These reflectors are all tubular in form, and the member shown in Fig. 10 is triangular in cross section, the member shown in Fig. 11 is square in cross section, and the member shown in Fig. 12 is circular in cross section. The surfaces of these members may be smooth but are preferably deformed in any suitable manner such as hereinbefore described so as to break up or diffuse the light pattern. As with the single fin member shown in Fig. 11 and described above, these various modifications have different uses wherein they produce unique light or color effects in the pattern obtained.

Very desirable effects may be obtained by the combination of one or more of these movable reflectors with a suitable background and/or an optical screen. The screen may be varied in its formation according to the type of light pattern and effect it is desired to obtain. The choice of screen is also influenced by other conditions such as the eventual location of the sign, the direction from which the sign will be observed, the amount of light incorporated with the sign or surrounding the sign, and for many other reasons.

Figure 13:
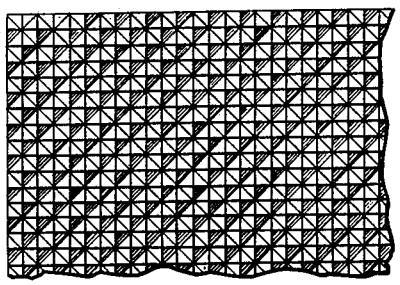
Figure 14:

The type of screen shown in elevation in Fig. 13 and in cross section in Fig. 14 comprises a sheet of glass having one surface formed into a plurality of prisms located next to each other. When this type of screen is combined with the unique reflecting members hereinbefore described, a light pattern comprising a plurality of stars is produced. In addition, this screen has an advantage in that the prisms, particularly if located on the outer surface, deflect the light to acute angles and consequently the pattern is clearly distinguishable to observers who are located to one side of the sign. This type of screen is commonly called a prismatized glass.

Figure 15:
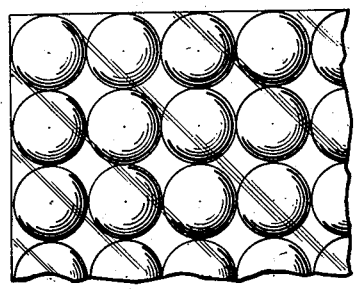
Figure 16:

Another type of screen which may be used is shown in Figs. 15 and 16. This screen comprises a glass sheet having a plurality of lenses extending from one surface thereof and located adjacent each other. This formation is commonly called a lenticulated glass. The lenticulated screen produces a light image that appears to comprise a plurality of sparkling bubbles. Due to the fact that the lens elements extend well away from the surface of the glass, the light pattern is clearly visible at acute angles with respect to the screen as with the prismatized glass.

Figure 17:
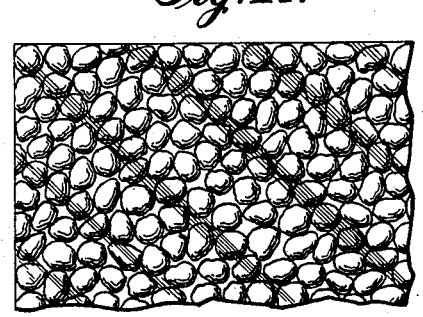
Figure 18:

A screen that is most satisfactory in the light pattern produced is shown in Figs. 17 and 18. This screen comprises a sheet of glass that is commonly called hammered glass. In looking at this glass it has an appearance similar to hammered metal or to a cobblestone pavement. Actually, one side of the glass has an undulating surface comprised by a plurality of comparatively flat lens elements of relatively irregular design and are closely located next to each other without clear lines of demarcation therebetween. A sign incorporating this type of screen presents a most desirable effect in that the light pattern is particularly sparkling and scintillating. In addition, a liquid effect is often produced according to the type of reflector and light source used.

Figure 19:
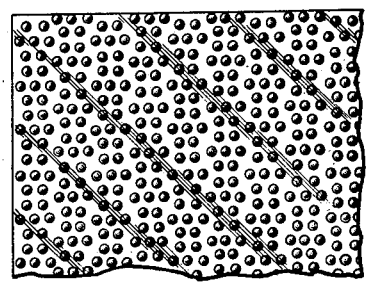
Figure 20:

Still another type of screen which is known as the "Diffusex" glass is shown in Figs. 19 and 20. One surface of this glass is formed into a plurality of very small irregular lens elements which presents a pebbly effect. These irregular formations are so close together that the glass has rather a smoky appearance. When used in combination with the hereinbefore described reflecting members, the light pattern produced thereby has a diffused bubbly or smoky effect which completely disguises the physical conformation of the means for producing these light patterns.

Additional types of screens may be used for other effects according to the purpose of the sign. A screen may be lenticulated or prismatized on both sides, for instance, or may be goffered, corrugated, or otherwise deformed on one or both surfaces so as to diffuse and/or refract the light directed therethrough by a reflector. Another form of screen that produces a very unique effect may comprise the well known glass bricks. These bricks are particularly suitable for outdoor displays.

A modification of a display unit incorporating the principles of the present invention is shown in Fig. 21. This unit may be in the form of a merchandise stand which may comprise a housing 1 having an upper surface 20 and supporting a horizontal sign column 21. This column 21 may include supporting end portions 22 and may comprise a glass tube or may be formed by a plurality of screens 2 arranged, for instance, in an octagonal formation as shown. A circular rotatable reflecting member 3 such as shown in Fig. 12 may be enclosed within the sign member 21 so that the light penetrating the column 21 may be cast out by the reflector 3. The column 21 may be vertically mounted on the base housing 1 which also may contain a motor for rotating said reflector. This type of construction is adapted to be associated with a sign or for the display of merchandise to draw the attention of an observer thereto. Indicia 17 may be mounted on the housing 1 or upon the sign member 21 as shown.

It is to be noted that throughout the many modifications as hereinbefore described, the essence of the invention lies in means for deforming or readjusting light rays so as to produce a light pattern without actual physical conformation. Likewise, it is desirable to disguise the physical conformation of the means for causing this pattern. The effect may be obtained either by the peculiar formation of the screen in itself, or in a combination of an irregular reflecting surface with an optically deformed screen for further deflecting and refracting light rays.

Many different effects may be produced by the use of the various types of reflectors above described in combination with the various types of screens hereinbefore mentioned. In constructing a sign according to the present invention, the type of reflector and/or type of screen to be incorporated therein may be chosen according to the type of matter to be advertised, the location of the sign with respect to its surroundings, and the location of the sign with respect to the observers.

Although certain specific embodiments of the present invention have been shown and described, many modifications thereof are possible, and the present disclosure should be construed only in an illustrative sense. The present invention, therefore, is not to be restricted except insofar as is necessitated by the prior art and by the spirit of the appended claims.

I claim:

1. Apparatus for display purposes, comprising in combination a screen, a reflector adapted to rotate with respect thereto, and a contrasting background disposed longitudinally of the axis of the reflector, said screen having optically effective formations on at least one side thereof and said reflector comprising a plurality of reflecting surfaces, whereby to direct light rays through said screen from substantially all angles to produce variable patterned illuminating effects thereon which are visible from substantially all angles.

2. Apparatus for display purposes, comprising in combination a screen, a reflector adapted to rotate with respect thereto, and a background reflector disposed longitudinally of the axis of the rotatable reflector, said screen having optically effective formations on at least one side thereof and said reflector comprising a plurality of reflecting surfaces, whereby to direct light rays through said screen from substantially all angles to produce variable patterned illuminating effects thereon which are visible from substantially all angles.

3. Apparatus for display purposes, comprising in combination a screen and a reflector adapted to rotate with respect thereto, said screen having optically effective formations on at least one side thereof and said reflector comprising a plurality of reflecting surfaces, and a light source arranged in juxta-position with respect to said reflector and extending substantially the full length thereof, whereby to direct light rays through said screen from substantially all angles, to produce variable patterned illuminating effects thereon which are visible from substantially all angles.

4. Apparatus for display purposes, comprising in combination a screen and a reflector adapted to rotate with respect to said screen, said screen having optically effective formations on at least one side thereof and said reflector comprising a plurality of reflecting faces having irregular surfaces, whereby to direct light rays through said screen from substantially all angles to produce variable patterned illuminating effects thereon which are visible from substantially all angles.

5. Apparatus for display purposes, comprising in combination a screen, a reflector adapted to rotate with respect thereto, and a contrasting background disposed longitudinally of the axis of the rotatable reflector, said screen having optically effective formations on at least one side thereof and said reflector comprising a twisted strip of reflecting material which is arranged so as to present a plurality of reflecting surfaces.

6. Apparatus for display purposes, comprising in combination a screen and a reflector adapted to rotate with respect thereto, said screen having optically effective formations on at least one side thereof and said reflector comprising a plurality of twisted strips of reflecting material which are arranged so as to present a plurality of reflecting surfaces.

7. Apparatus for display purposes, comprising in combination a screen and a reflector adapted to rotate with respect to said screen, said screen having optically effective formations on at least one side thereof and said reflector comprising a twisted strip of reflecting material which is arranged so as to present a plurality of reflecting faces having irregular surfaces.

8. Apparatus for display purposes, comprising in combination a screen and a reflector adapted to rotate with respect thereto, said screen having optically effective formations on at least one side thereof and said reflector comprising a strip of reflecting material which is helically twisted about its longitudinal axis so as to present a plurality of reflecting surfaces, said strip being arranged so that each twist of 180° forms a reflecting face that appears substantially square.

9. Apparatus for display purposes, comprising in combination a screen and a reflector adapted to rotate with respect thereto, said screen having optically effective formations on at least one side thereof and said reflector comprising a strip of reflecting material which is helically twisted about its longitudinal axis so as to present a plurality of reflecting surfaces, said strip being twisted so as to produce substantially square optical effects.

10. Apparatus for display purposes, comprising in combination a screen and a reflector adapted to rotate with respect thereto, said screen having optically effective formations on at least one side thereof and said reflector comprising a twisted strip of reflecting material which is arranged so as to present a plurality of reflecting faces, the surface of said reflector being corrugated, whereby to direct light rays through said screen from substantially all angles to produce light patterns thereon which are visible from substantially all angles.

11. Apparatus for display purposes, comprising in combination a screen, a reflector adapted to rotate with respect thereto, and a contrasting background disposed longitudinally of the axis of the rotatable reflector, said screen having optical formations on at least one side thereof and said reflector comprising a geometrical form which is arranged so as to present a plurality of reflecting surfaces, whereby to direct light rays through said screen from substantially all angles to produce light patterns thereon which are visible from substantially all angles.

12. Apparatus for display purposes, comprising in combination a screen having optically effective formations on at least one side thereof, a reflector adapted to rotate with respect thereto and comprising a twisted strip of reflecting material which is arranged so as to present a plurality of reflecting surfaces, and a light source arranged in juxtaposition with respect to said reflector and extending substantially the full length thereof, whereby to direct light rays through said screen from substantially all angles to produce variable patterned illuminating effects thereon which are visible from substantially all angles.

13. Apparatus for display purposes, comprising in combination a screen having optically effective formations on at least one side thereof, a reflector adapted to rotate with respect thereto and comprising a geometrical form which is arranged so as to present a plurality of reflecting surfaces, and a light source arranged in juxtaposition with respect to said reflector and extending substantially the full length thereof, whereby to direct light rays through said screen from substantially all angles to produce variable patterned illuminating effects thereon which are visible from substantially all angles.

14. Apparatus for display purposes, comprising in combination, an optically effective screen and a reflector adapted to rotate with respect thereto, said reflector formed of metal foil and comprising a plurality of reflecting faces having irregular surfaces, whereby to direct light rays through said screen from substantially all angles to produce variable patterned illuminating effects thereon which are visible from substantially all angles.

15. Apparatus for display purposes, comprising in combination, an optically effective screen and a reflector adapted to rotate with respect thereto, said reflector formed of metal foil and comprising a plurality of reflecting faces having angularly disposed irregular surfaces, whereby to direct light rays through said screen from substantially all angles to produce variable patterned illuminating effects thereon which are visible from substantially all angles.

16. Apparatus for display purposes, comprising in combination, an optically effective screen and a reflector adapted to rotate with respect thereto, said reflector comprising a strip of metal foil twisted about its longitudinal axis so as to present a plurality of reflecting surfaces.

17. Apparatus for display purposes, comprising in combination, an optically effective screen and a reflector adapted to rotate with respect thereto, said reflector comprising a strip of metal foil twisted about its longitudinal axis so as to present a plurality of reflecting faces having irregular surfaces.

18. Apparatus for display purposes, comprising in combination, an optically effective screen and a reflector adapted to rotate with respect thereto, said reflector comprising a strip of metal foil twisted about its longitudinal axis so as to present a plurality of reflecting faces having angularly disposed irregular surfaces.

19. Apparatus for display purposes, comprising in combination, an optically effective screen and a reflector adapted to rotate with respect thereto, said reflector comprising a strip of metal foil twisted about its longitudinal axis so as to present a plurality of reflecting surfaces, said surfaces being twisted so as to produce substantially square illuminated optical effects on said screen.

20. Apparatus for display purposes, comprising in combination, an optically effective screen and a reflector adapted to rotate with respect thereto, said reflector comprising a strip of metal foil twisted about its longitudinal axis so as to present a plurality of reflecting surfaces, said strip being arranged so that each twist of 180° forms a reflecting face that appears substantially square.

21. Apparatus for display purposes, comprising in combination, an optically effective screen and a reflector adapted to rotate with respect thereto, said reflector comprising a strip of metal foil twisted about its longitudinal axis so as to present a plurality of reflecting surfaces, the surfaces of said reflector being corrugated.

22. Apparatus for display purposes, comprising in combination, an optically effective screen and a reflector adapted to rotate with respect thereto, said reflector comprising a strip of metal foil twisted about its longitudinal axis so as to present a plurality of reflecting surfaces, said strip being twisted so as to produce substantially square reflecting faces, the surfaces of said reflector being corrugated.

23. Apparatus for display purposes, comprising in combination, an optically effective screen and a reflector adapted to rotate with respect thereto, said reflector being formed of metal foil and comprising a geometrical form which is arranged so as to present a plurality of reflecting faces having angularly disposed irregular surfaces.

24. Apparatus for display purposes, comprising in combination, a rotatable reflector formed of metal foil and comprising a plurality of reflecting surfaces, and a light source arranged in juxtaposition therewith and adapted to direct light rays thereto, said light source extending substantially the full length of said reflector, whereby to direct light rays at substantially all angles to produce variable patterned iluminating effects.

GEORGE H. EVANS.